United States Patent
Chen et al.

(10) Patent No.: US 11,570,605 B2
(45) Date of Patent: Jan. 31, 2023

(54) BLUETOOTH COMMUNICATION SYSTEM, ELECTRONIC DEVICE AND BLUETOOTH CHIP HAVING LOW POWER CONSUMPTION

(71) Applicant: Audiowise Technology Inc., Hsinchu County (TW)

(72) Inventors: Yu-Feng Chen, Hsinchu County (TW); Chih-Wei Sung, Hsinchu County (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 17/326,683

(22) Filed: May 21, 2021

(65) Prior Publication Data
US 2021/0281991 A1 Sep. 9, 2021

Related U.S. Application Data

(63) Continuation-in-part of application No. 17/223,019, filed on Apr. 6, 2021, now Pat. No. 11,330,416, which is a continuation of application No. 16/726,838, filed on Dec. 25, 2019, now Pat. No. 10,999,725, which is a continuation of application No. 16/034,370, filed on Jul. 13, 2018, now Pat. No. 10,555,156, which is a continuation-in-part of application No. 15/808,853, filed on Nov. 9, 2017, now Pat. No. 10,212,569.

(51) Int. Cl.
| | | |
|---|---|---|
| H04W 72/04 | (2009.01) | |
| H04W 4/80 | (2018.01) | |
| H04L 1/16 | (2006.01) | |
| H04R 1/10 | (2006.01) | |
| H04R 3/00 | (2006.01) | |

(52) U.S. Cl.
CPC ............... *H04W 4/80* (2018.02); *H04L 1/16* (2013.01); *H04R 1/1091* (2013.01); *H04W 72/0446* (2013.01); *H04R 3/00* (2013.01); *H04R 2420/07* (2013.01)

(58) Field of Classification Search
CPC ... H04W 4/80; H04W 72/04; H04W 72/0446; H04L 1/16; H04L 1/22; H04R 1/1091; H04R 2420/07; H04R 3/00; H04R 1/10
See application file for complete search history.

(56) References Cited

U.S. PATENT DOCUMENTS

| | | | | |
|---|---|---|---|---|
| 5,396,490 A | * | 3/1995 | White ................. | H04L 9/40 370/474 |
| 6,945,461 B1 | * | 9/2005 | Hien ................ | G06K 19/07732 235/441 |

(Continued)

FOREIGN PATENT DOCUMENTS

| | | |
|---|---|---|
| CN | 1368798 A | 9/2002 |
| CN | 103973423 A | 8/2014 |

(Continued)

*Primary Examiner* — Tuan H Nguyen
(74) *Attorney, Agent, or Firm* — Winston Hsu

(57) ABSTRACT

There is provided an electronic device having Bluetooth communication function. The electronic device confirms whether a current packet received in a receive slot is a retransmitted packet according to a SEQN bit in the packet header so as to determine whether to continuously turn on an RF receiver in the receive slot or early turn off the RF receiver to save power.

10 Claims, 4 Drawing Sheets

(56) References Cited

U.S. PATENT DOCUMENTS

| | | |
|---|---|---|
| 9,621,987 B2 | 4/2017 | Watson |
| 2005/0058116 A1 | 3/2005 | Palin |
| 2007/0036247 A1* | 2/2007 | Capretta ................. H04L 27/22 |
| | | 375/350 |
| 2012/0058727 A1 | 3/2012 | Cook |
| 2014/0086216 A1 | 3/2014 | Yang |
| 2014/0329468 A1 | 11/2014 | Watson |
| 2018/0084606 A1 | 3/2018 | Li |

FOREIGN PATENT DOCUMENTS

| | | |
|---|---|---|
| CN | 105284134 A | 1/2016 |
| CN | 106571894 A | 4/2017 |
| CN | 106878384 A | 6/2017 |
| CN | 106937197 A | 7/2017 |
| CN | 107071618 A | 8/2017 |

* cited by examiner

BLUETOOTH COMMUNICATION SYSTEM, ELECTRONIC DEVICE AND BLUETOOTH CHIP HAVING LOW POWER CONSUMPTION

CROSS REFERENCE TO RELATED APPLICATION

The present application is a continuation-in-part application of U.S. Non-provisional application Ser. No. 17/223,019, filed on Apr. 6, 2021, which is continuation application of U.S. Non-provisional application Ser. No. 16/726,838 filed on Dec. 25, 2019, which is a continuation application of U.S. Non-provisional application Ser. No. 16/034,370 filed on Jul. 13, 2018, which is a continuation in part application of U.S. Non-provisional application. Ser. No. 15/808,853 filed on Nov. 9, 2017, the disclosures of which are hereby incorporated by reference herein in their entirety.

BACKGROUND

1. Field of the Disclosure

This disclosure generally relates to Bluetooth communication and, more particularly, to a Bluetooth communication system, an electronic device and a Bluetooth chip thereof that confirm whether a retransmitted packet is being received in a receive slot after an RF receiver is turned on to determine whether to early turn off the RF receiver in the receive slot thereby reducing the power consumption.

2. Description of the Related Art

Please refer to FIG. 1, it is a schematic diagram of the message exchange between a master device and a slave device of a Bluetooth communication system. The slave device uses a time interval is in each receive slot RX thereof to receive packets from the master device, and the master device uses a time interval tm in each receive slot RX thereof to receive packets from the slave device.

In the current Bluetooth standard protocol, the data payload shall be repeatedly retransmitted until a source receives a positive acknowledgement or a timeout is exceeded. When the source repeatedly transmits the data payload, a destination keeps receiving identical data payload to waste unnecessary power.

Accordingly, the present disclosure provides a Bluetooth module or chip embedded with a judgment reference that identifies whether a current packet is a retransmitted packet within every receive slot of a destination so as to immediately turn off the RF receiver and/or the modem of the destination so as to reduce the unnecessary power consumption in the packet exchange.

SUMMARY

The present disclosure provides a Bluetooth communication system, an electronic device and a Bluetooth chip thereof that identify whether a current packet in every receive slot is a retransmitted packet so as to identify whether to continuously receive data payload of the current packet in every receive slot.

The present disclosure provides an electronic device including an antenna and a Bluetooth chip. The antenna is configured to receive a packet. The Bluetooth chip is configured to identify whether the packet is a retransmitted packet according to a header of the packet after identifying that the packet is an ACL packet in a receive slot to accordingly determine whether to stop continuously receiving payload of the packet in the receive slot.

The present disclosure further provides a Bluetooth chip including an antenna, an RF receiver, a modem and a BT controller. The antenna is configured to receive a packet and generate a received signal accordingly. The RF receiver is configured to perform analog processing on the received signal corresponding to a receive slot and generate a digital signal. The modem is configured to perform digital processing on the digital signal corresponding to the receive slot and generate a demodulated packet. The BT controller is configured to identify whether the demodulated packet is a retransmitted packet to accordingly determine to early turn off at least one of the RF receiver and the modem in the receive slot.

The present disclosure further provides a Bluetooth communication system including a master device and a first electronic device. The master device is configured to transmit a packet. The first electronic device is configured to identify whether the packet is a retransmitted packet according to a header of the packet after identifying that the packet is an ACL packet in a receive slot to accordingly determine whether to stop continuously receiving payload of the packet in the receive slot.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

One objective of the present disclosure is to provide a Bluetooth communication system, an electronic device and a Bluetooth chip thereof that identify whether to early turn off an analog front end and a part of a digital backend in every receive slot (e.g., RX shown in FIG. 3) according to a header of a current packet so as to stop continuously receiving payload of the current packet behind the header in the receive slot RX thereby saving the power of repeatedly receiving the same packet.

In the present disclosure, the electronic device (including the first electronic device and the second electronic device mentioned below) is selected, without particular limitations, from, for example a portable electronic device, a wearable electronic device, a vehicle electronic device, a computer peripheral, a Bluetooth earphone, a Bluetooth speaker or other electronic devices using Bluetooth communication to transmit and receive data.

The electronic device of the present disclosure is a master device or a slave device in the Bluetooth communication. The electronic device receives a current packet sent within a receive slot RX in the connection state via a Bluetooth chip thereof and identifies whether the current packet is a retransmitted packet or not. In this way, it is able to prevent the destination from still turning on the RF receiver and the modem thereof to receive same packets over and over to waste unnecessary power when the source is retransmitting packets.

Figure 1:
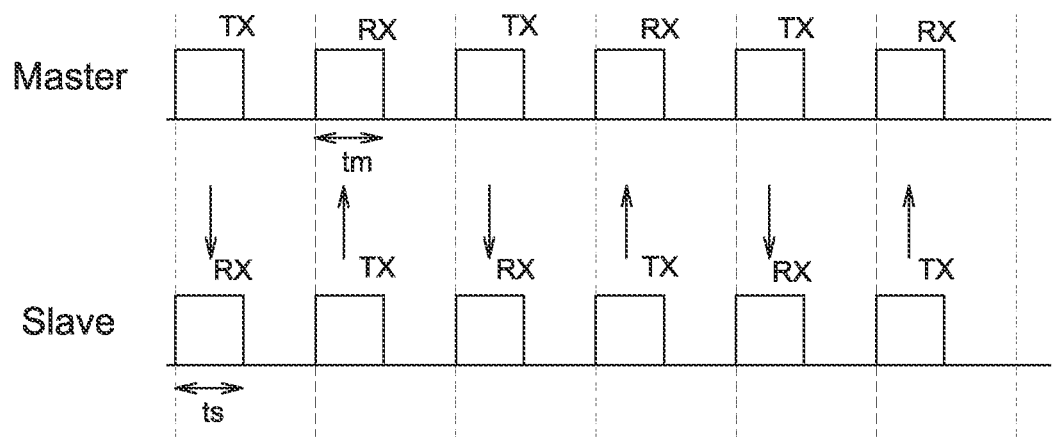
FIG. 1 is a schematic diagram of the message exchange of a Bluetooth communication system.
Figure 2:
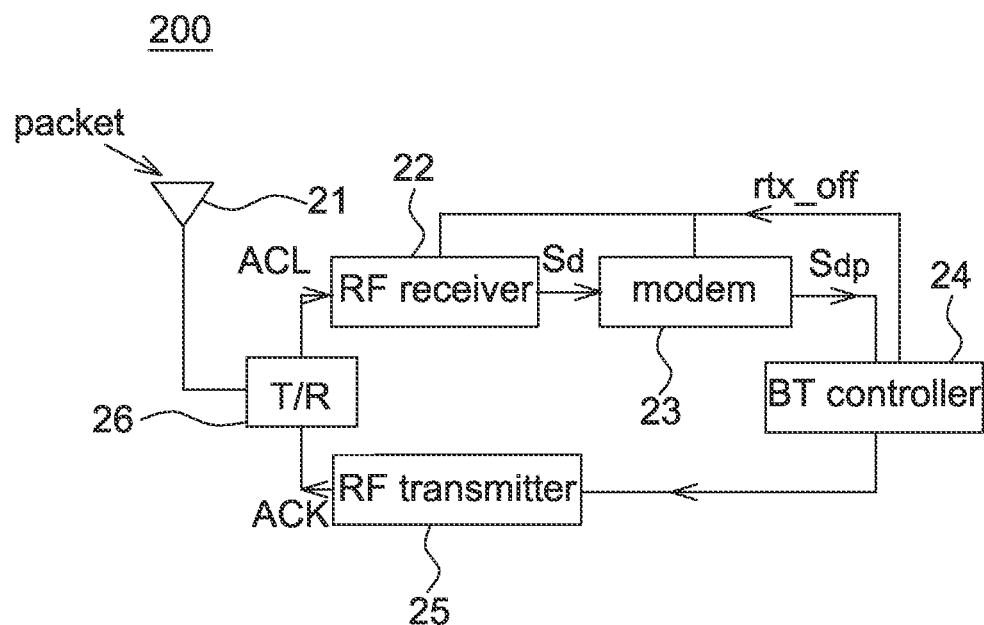
FIG. 2 is a block diagram of a Bluetooth chip of an electronic device according to one embodiment of the present disclosure.

Please refer to FIG. 2, it is a block diagram of a Bluetooth chip 200 of an electronic device according to one embodiment of the present disclosure. The Bluetooth chip 200 includes an antenna 21, an radio frequency (RF) receiver 22, a modem 23, a Bluetooth controller (shown as BT controller) 24 and an RF transmitter 25, wherein the RF receiver 22 is also referred to an analog front end herein, and the modem 23 and the BT controller 24 are also referred to a digital backend herein.

FIG. 2 shows that the Bluetooth chip 200 further includes a switch (shown as T/R) 26 for electrically connecting the antenna 21 to the RF receiver 22 or the RF transmitter 25 to perform the signal receiving or the signal transmitting. In another aspect, the Bluetooth chip 200 includes two antennas for respectively connecting to the RF receiver 22 and the RF transmitter 25, such that it is not necessary to adopt the switch 26 to switch between the signal receiving and the signal transmitting.

The electronic device of the present disclosure receives a current packet via the antenna 21.

It should be mentioned that although FIG. 2 shows that the antenna 21 is one component of the Bluetooth chip 200, the present disclosure is not limited thereto. In another aspect, the antenna 21 is one component of the electronic device and arranged outside the Bluetooth chip 200, and the RF receiver 22 is electrically connected to the antenna 21 to receive the current packet.

Figure 3:
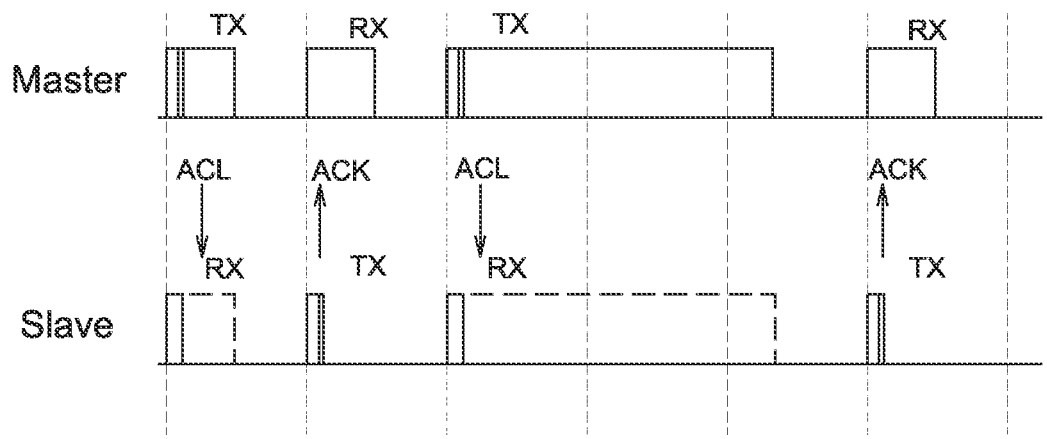
FIG. 3 is a schematic diagram of the message exchange of a Bluetooth communication system according to one embodiment of the present disclosure.

The Bluetooth chip 200 receives a current packet in a receive slot (e.g., RX shown in FIG. 3), wherein the current packet is referred to a packet transmitted in the receive slot RX. As mentioned above, the Bluetooth chip 200 is arranged in a master device or a slave device, and FIG. 3 is described in the way that the Bluetooth chip 200 is arranged in the slave device as an example.

After identifying that a current packet sent in the receive slot RX is an asynchronous connection-oriented (ACL) packet, the Bluetooth chip 200 then identifies whether the current packet is a retransmitted packet according to a header of the current packet to accordingly determine whether to stop continuously receiving payload of the current packet in the receive slot RX.

In one aspect, the Bluetooth chip 200 identifies whether a current packet is a retransmitted packet according to an SEQN (Sequential Numbering scheme) bit of a header of the current packet. For example, when the SEQN bit in the current packet header is identical to the SEQN bit of a previous packet header (e.g., received in a previous receive slot), the current packet is identified as a retransmitted packet; on the contrary, the current packet is not a retransmitted packet and should be received continuously.

In one aspect, the Bluetooth chip 200 further identifies and records whether the cyclic redundancy check (CRC) check of a packet previous to the current packet is passed. For example, the Bluetooth chip 200 has a register for recording whether the CRC check is passed (e.g., recorded as digital vale 1, but not limited to) or not passed (e.g., recorded as digital vale 0, but not limited to). If the CRC check is passed, it means that the previous packet is received completely.

More specifically, in the aspect that the antenna 21 is arranged in the Bluetooth chip 200, the antenna 21 is used to receive a packet and accordingly generate a received signal, e.g., shown as a signal ACL in FIG. 2. As the present disclosure is to reduce power consumption by not receiving payload of a current packet, the receiving is terminated early to not receive the followed data payload when the current packet is an ACL packet.

The RF receiver 22 performs analog processing on the signal ACL in the receive slot RX and generates a digital signal Sd. For example, the RF receiver 22 includes an analog-to-digital converter (not shown) for performing the analog-digital conversion. The method of the analog-digital conversion is known to the art, and thus details thereof are not described herein.

In one aspect, the RF receiver 22 further includes other components to perform analog signal processing on the received signal ACL, e.g., including a low noise amplifier (LNA), a mixer and an amplifier. Said other components are known to the art and not a main objective of the present disclosure, and thus details thereof are not described herein. It is appreciated that functions of every component of the RF receiver 22 are all considered to be executed by the RF receiver 22.

The modem 23 is used to perform digital processing on the digital signal Sd in the receive slot RX, and generate a demodulated packet Sdp. For example, the modem 23 includes a demodulator (not shown) for decoding the encoded packet sent from the source (e.g., master device shown in FIG. 3) to recover the original packet (i.e. the demodulated packet Sdp).

In one aspect, the modem 23 further includes other components to perform digital signal processing on the digital signal Sd, e.g., including an auto gain controller (AGC), down LPF, DC remover, rotator and low pass filter (LPF). The down LPF is, for example, a sinc filter for down-sampling and reducing valid bits of the digital signal Sd. The DC remover is for cancelling the DC interference at 0 MHZ and coupled downstream of the down LPF. The rotator is for frequency shifting to rotate data of 1 MHZ to 0 MHZ and coupled downstream of the DC remover. The LPF is for cancelling interference and coupled downstream of the rotator. The AGC is coupled downstream of the LPF. Said other components are known to the art and not a main objective of the present disclosure, and thus details thereof are not described herein. It is appreciated that functions of every component in the modem 25 are all considered to be executed by the modem 25.

The BT controller (e.g., implemented by hardware) 24 identifies whether the demodulated packet Sdp is a retransmitted packet or not, and accordingly determines whether to early turn off at least one of the RF receiver 22 and the modem 23 in the corresponding receive slot RX. For example, when a current packet is identified as a retransmitted packet (i.e. the SEQN bit of the header not changed), the BT controller 24 sends a control signal rtx_off to the RF receiver 22 and/or the modem 23 to stop continuously receiving followed payload by turning off at least one of the RF receiver 22 and the modem 23 after receiving the header. The BT controller 27 includes a processor for performing functions thereof.

Preferably, the BT controller 27 further identifies whether the CRC check of a previous demodulated packet is passed or not to confirm whether said previous demodulated packet is completely received. If the previous demodulated packet is not completely received, the current data payload should be received no matter whether the current packet is a retransmitted packet or not.

Figure 4:
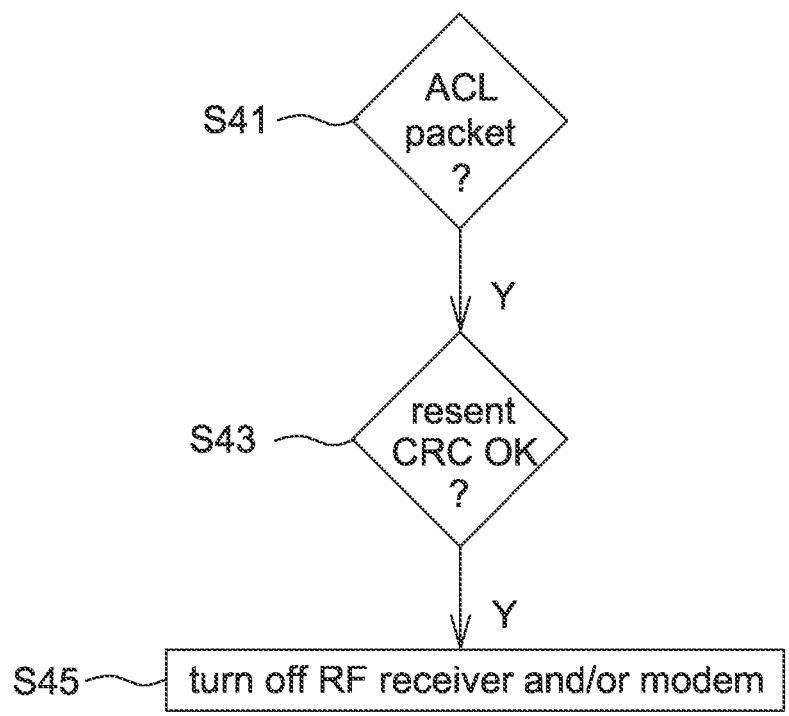
FIG. 4 is a flow chart of an operating method of a Bluetooth chip of an electronic device according to one embodiment of the present disclosure.

Please refer to FIGS. 3 and 4, FIG. 3 is a schematic diagram of the message exchange of a Bluetooth communication system according to one embodiment of the present disclosure; and FIG. 4 is a flow chart of an operating method of a Bluetooth chip 200 of an electronic device according to one embodiment of the present disclosure. The operating method includes: confirming whether a current packet is an ACL packet (Step S41); confirming whether the current packet is a retransmitted packet and whether the CRC check is passed when the current packet is the ACL packet (Step S43); and turning off at least one of an RF receiver and a modem (Step S45). Functions of FIG. 4 are mainly performed by the BT controller 24.

Step S41: The BT controller 24 of the destination identifies whether a current packet (e.g., a packet being analog-digital converted and demodulated as mentioned above) is an ACL packet, which includes CRC data payload. When the current packet is an ACL packet, the Step S43 is entered. However, if the current packet is not an ACL packet, there is no need to consider whether to continuously receive CRC data payload.

Step S43: The BT controller 24 then confirms whether the current packet is a retransmitted packer according to whether the SEQN bit of a header of the current packet has a variation (e.g., from 1 to 0 or from 0 to 1 between successive receive slots). Preferably, the BT controller 24 further confirms whether a packet previous to the current packet is received completely, e.g., passing CRC check.

The CRC check and a format of header are known to the art and thus details thereof are not described herein.

Step S45: When the current packet is confirmed as a retransmitted packet and the previous packet has passed the CRC check, it means that CRC data payload of the current packet is not necessary to be received. Therefore, the BT controller 24 sends a control signal rtx_off to turn off the RF receiver 22 and/or the modem 23 so as to stop continuously receiving CRC data payload of the current packet in the current receive slot RX.

In FIG. 3, the time interval not receiving the data payload after the header is shown by dashed line. It is clearly seen that when the data payload is larger, more power can be saved.

Figure 5A:
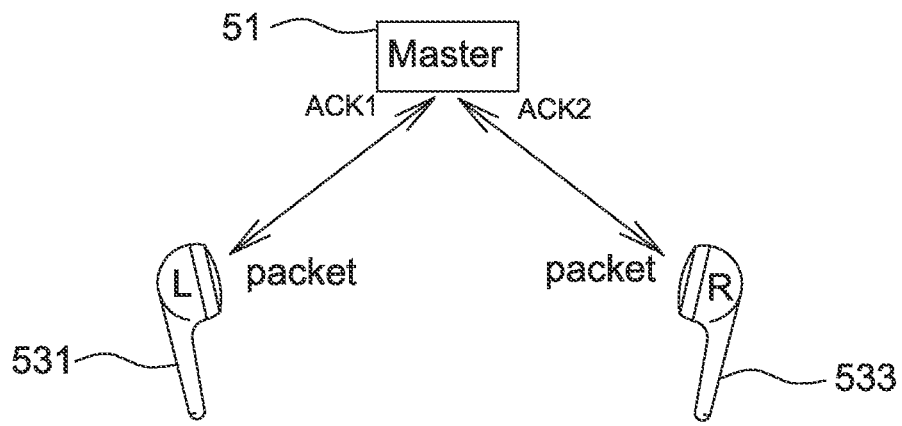
FIG. 5A is an operational schematic diagram of a Bluetooth communication system according to one embodiment of the present disclosure.
Figure 5B:
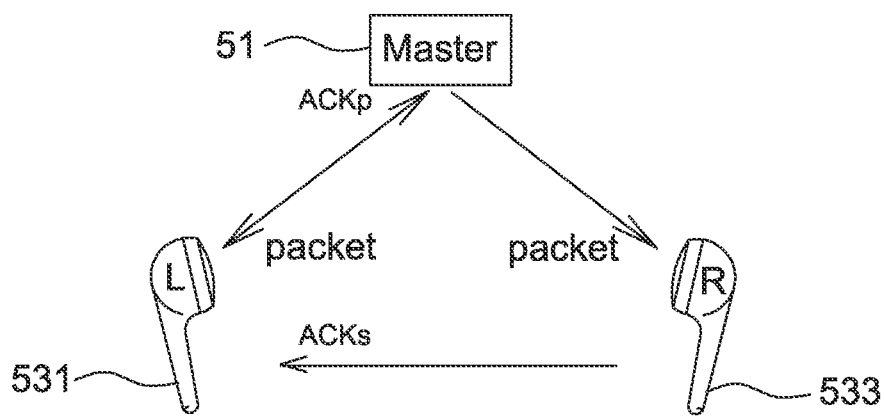
FIG. 5B is an operational schematic diagram of a Bluetooth communication system according to another embodiment of the present disclosure.

Please refer to FIGS. 5A and 5B, when the electronic device of the present disclosure is implemented by a true wireless stereo (TWS) earphone set, a first electronic device (e.g., for left ear, but not limited to) 531 and a second electronic device (e.g., for right ear, but not limited to) 533 are included. The first electronic device 531 and the second electronic device 533 respectively include the Bluetooth chip 200 shown in FIG. 2.

In one aspect, the first electronic device 531 and the second electronic device 533 are both slave devices of a Bluetooth communication system, and used to respectively receive a packet transmitted from a master device (e.g., a cellphone, vehicle central controller, but not limited to) 51.

After identifying the packet in a receive slot RX is an ACL packet, the first electronic device 531 and the second electronic device 533 identify whether the packet is a retransmitted packet according to a header of the packet, and accordingly determine whether to stop continuously receiving payload of the packet in the receive slot RX, i.e. turning off the RF receiver and/or the modem therein.

Please refer to FIG. 5A, after receiving every packet (e.g., passing the CRC check), the first electronic device 531 and the second electronic device 533 respectively transmit an ACK (shown as ACK1 and ACK2) in the respective transmit slot TX to the master device 51. When the master device 51 does not receive the ACK from at least one of the first electronic device 531 and the second electronic device 533 (i.e. not ACK1 and/or ACK2), the master device 51 transmits the same packet again, i.e. retransmitting packet.

When identifying that one packet is a retransmitted packet, the first electronic device 531 does not continuously receive payload of the one packet in the corresponding receive slot RX, and sends out an ACK1 in a transmit slot TX next to the receive slot RX. When identifying that one packet RX is a retransmitted packet, the second electronic device 533 does not continuously receive payload of the one packet in the corresponding receive slot RX, and sends out an ACK2 in a transmit slot TX next to the receive slot RX.

Figure 6:
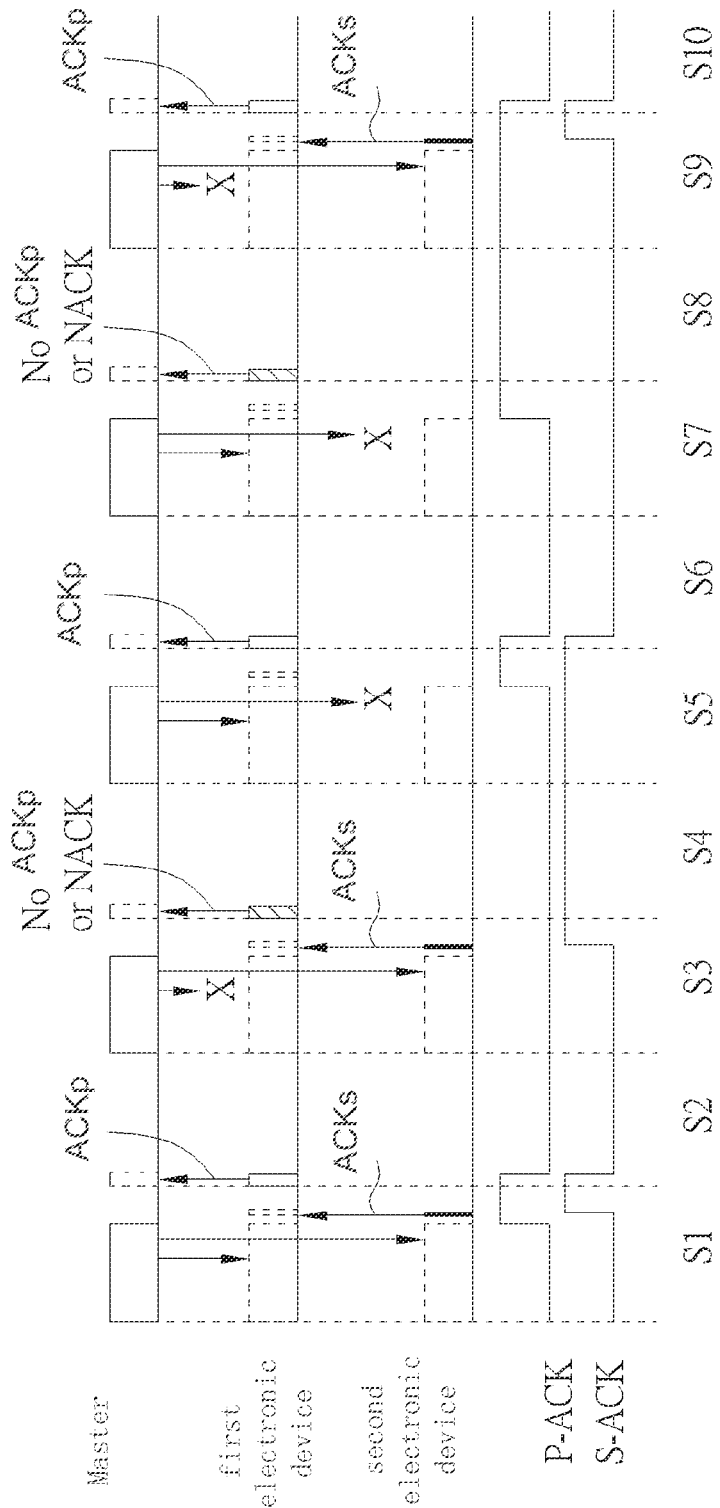
FIG. 6 is a schematic diagram of the message exchange of the Bluetooth communication system of FIG. 5B.

Please refer to FIGS. 5B and 6, the first electronic device 531 is a primary slave of a Bluetooth communication system, and the second electronic device 533 is a secondary slave of the Bluetooth communication system. After receiving every packet (e.g., passing CRC check) from the master device 51, the second electronic device 533 transmits a secondary ACKs to the first electronic device 531. After receiving every packet (e.g., passing CRC check) from the master device 51 and receiving the secondary ACKs from the second electronic device 533, the first electronic device 531 transmits an ACKp to the master device 51.

When the master device 51 does not receive the ACKp from the first electronic device 531 (ACKs being irrelevant to the master device 51), the master device 531 transmits the same packet again, i.e. retransmitting packet.

However, the first electronic device 531 and the second electronic device 533 are not limited to receive a packet from the master device 51 in the same receive slot. As shown in FIG. 6, the first electronic device 531 and the second electronic device 533 receive the packet from the master device 51 in different receive slots, e.g., S3 and S5 or S7 and S9. The symbols "X" shown in FIG. 6 indicate that the packet sent by the master device 51 is not received.

When identifying (e.g., using the BT controller thereof) that a packet is a retransmitted packet and the secondary ACKs from the second electronic device 533 is not received (e.g., receive slot S7), in addition to not continuously receiving payload of the packet in the receive slot S7 (e.g., by turning off the RF receiver and/or the modem thereof), the first electronic device 531 does not transmit an ACKp or transmits an NACK in a transmit slot S8 next to the receive slot S7 to cause the master device 531 to retransmit the packet again.

In this embodiment, the first electronic device 531 transmits the ACKp in a next transmit TX only when the packet from the master device 51 and the secondary ACKs from the second electronic device 533 are received in successive receive slots, i.e. either in the same receive slot or different receive slots as shown in FIG. 6.

As mentioned above, because the Bluetooth module of conventional electronic devices does not have the function of determining whether to continuously receive rest of a packet according to RSSI, the RF receiver is still turned on in a receive slot for receiving the whole retransmitted packet to waste power in receiving payload of the retransmitted packet. Therefore, the present disclosure further provides a Bluetooth communication system (referring to FIGS. 5A and 5B) and an electronic device as well as a Bluetooth chip thereof (e.g., FIG. 2) that identify whether a current packet in every receive slot is a retransmitted packet according to the packet header thereof so as to determine whether to early turn off at least one of a RF receiver and a modem to save power.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An electronic device, comprising:
an antenna, configured to receive a packet; and
a Bluetooth chip, configured to,
identify whether the packet in a receive slot is a retransmitted packet according to an SEQN bit of a header of the packet; and
stop continuously receiving payload of the packet behind the header of the packet in the receive slot after identifying that the SEQN bit of the header is not changed;
wherein
the Bluetooth chip comprises an RF receiver and a modem, and
when identifying that the packet is the retransmitted packet after identifying that the SEQN bit of the header is not changed, the Bluetooth chip is configured to
stop continuously receiving the payload behind the header of the packet in the receive slot by turning off at least one of the RF receiver and the modem, and
transmit an ACK in a transmit slot next to the receive slot.

2. The electronic device as claimed in claim 1, wherein the Bluetooth chip is further configured to identify and record whether a CRC check of a previous packet is passed.

3. The electronic device as claimed in claim 2, wherein when identifying (i) that the packet is the retransmitted packet after identifying that the SEQN bit of the header is not changed and (ii) that the CRC check of the previous packet is passed, the Bluetooth chip is further configured to not receive CRC data of the packet in the receive slot.

4. The electronic device as claimed in claim 1, wherein the electronic device is a slave device of a Bluetooth communication system.

5. The electronic device as claimed in claim 1, wherein when identifying that another packet is a retransmitted packet after identifying that an SEQN bit of a header of the another packet is not changed, the Bluetooth chip is further configured to
stop continuously receiving payload of the another packet in another receive slot, and
either not transmit an ACK, or transmit an NACK, in another transmit slot next to the another receive slot.

6. The electronic device as claimed in claim 5, wherein the electronic device is a primary slave device of a Bluetooth communication system, and
the Bluetooth chip is configured to either not transmit the ACK, or transmit the NACK, in the another transmit slot next to the another receive slot when the primary slave device does not receive a secondary ACK in the another receive slot from a secondary slave device of the Bluetooth communication system.

7. A Bluetooth communication system, comprising:
a master device, configured to transmit a packet;
a first electronic device, configured to,
identify whether the packet in a receive slot is a retransmitted packet according to an SEQN bit of a header of the packet; and
stop continuously receiving payload of the packet behind the header of the packet in the receive slot after identifying that the SEQN bit of the header is not changed; and
a second electronic device;
wherein
the master device is configured to transmit an identical packet in response to not receiving an ACK of at least one of the first electronic device and the second electronic device;
the first electronic device or the second electronic device respectively comprises an RF receiver and a modem, and
when the first electronic device or the second electronic device identifies that the packet is the retransmitted packet after identifying that the SEQN bit of the header is not changed, the first electronic device or the second electronic device is configured to
stop continuously receiving the payload behind the header of the packet in the receive slot by turning off at least one of the RF receiver and the modem, and
transmit the ACK in a transmit slot next to the receive slot.

8. The Bluetooth communication system as claimed in claim 7, wherein the first electronic device is further configured to identify whether a CRC check of a previous packet is passed.

9. The Bluetooth communication system as claimed in claim 7, wherein
the first electronic device is a primary slave device,
the second electronic device is a secondary slave device, and
the master device is configured to transmit an identical packet in response to not receiving an ACK from the first electronic device or in response to receiving an NACK from the first electronic device.

10. The Bluetooth communication system as claimed in claim 9, wherein when identifying (i) that another packet is a retransmitted packet after identifying that an SEQN bit of a header of the another packet is not changed and (ii) that a secondary ACK from the second electronic device is not received, the first electronic device is configured to
stop continuously receiving payload of the another packet in another receive slot, and
either not transmit the ACK, or transmit the NACK, in another transmit slot next to the another receive slot.

* * * * *